Jan. 21, 1936.  P. E. KUHL  2,028,336
METHOD OF CARRYING OUT CHEMICAL REACTIONS
Filed Oct. 5, 1932
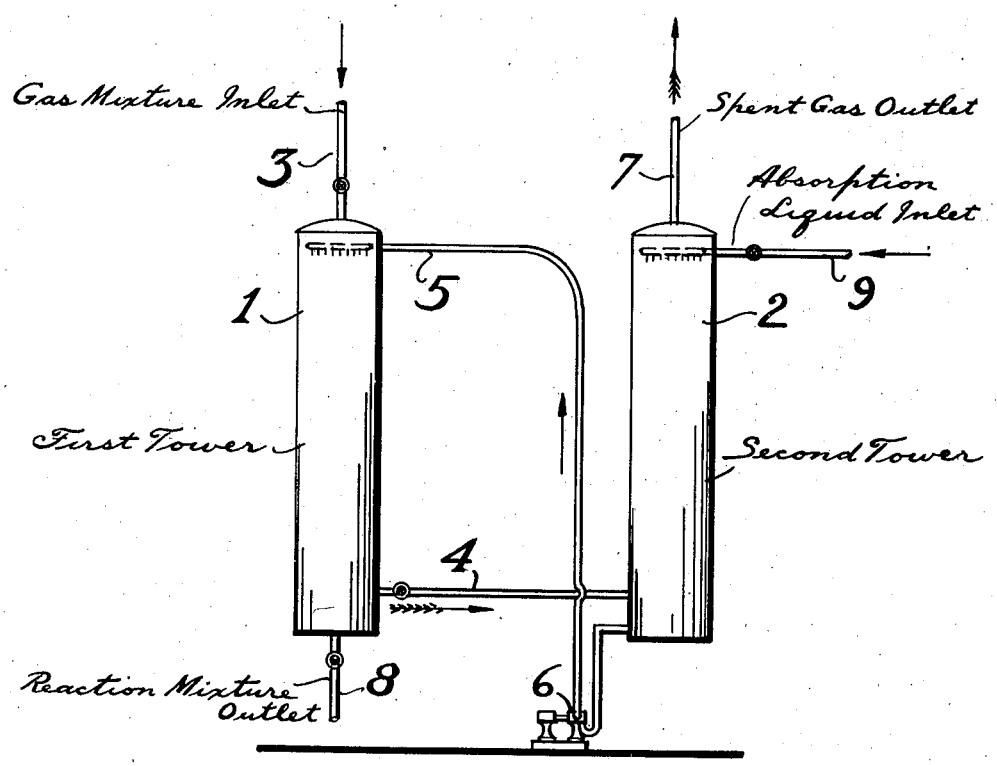
Paul E. Kuhl   INVENTOR.
BY
W. E. Currie   ATTORNEYS.

Patented Jan. 21, 1936

2,028,336

UNITED STATES PATENT OFFICE 2,028,336

METHOD OF CARRYING OUT CHEMICAL REACTIONS

Paul E. Kuhl, Elizabeth, N. J., assignor to Standard Oil Development Company, a corporation of Delaware Application October 5, 1932, Serial No. 636,341

6 Claims. (Cl. 23—2)

This invention relates to a method of reacting two gases in a liquid solvent, one of the gases being much more readily soluble in the liquid than the other one, in two steps, the first step being a concurrent contact with the liquid and the second a counter-current contact. The solution withdrawn from the second step is used as absorbent in the first step.

The main object of the invention is the carrying out of the reaction using only a minimum amount of the solvent liquid. Other objects and advantages will be evident from the following description when read in conjunction with the drawing, the sole figure of which is a diagrammatic side elevation partly in section of the apparatus used for carrying out the invention.

In the figure the numerals 1 and 2 designate a first and second absorption and reaction tower, 3 a line for feeding the gas mixture to the first tower, 4 a gas transfer line between the first and the second tower, 5 a liquid transfer line between the second and the first tower with the pump 6. 7 is a line for removing spent gas, 8 another line for removing the reaction mixture and 9 is the line for charging the absorption liquid. The towers may be provided with contact means, such as packing, in case the reaction product remains in solution. When the reaction product precipitates in the form of a solid, the use of packing is not desirable, but wooden grids made of triangular pieces may be used.

The liquid medium in which the reaction takes place is usually water although it may be an organic solvent such as benzol, carbon tetrachloride, etc., in the solution of which the gases react.

The invention will be more fully described as applied to the removal of $NH_3$ and $H_2S$ from a gas mixture containing these constituents. These two gases react in aqueous solution according to the following equations:

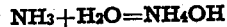

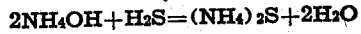

The $NH_3$ is much more readily soluble in water than the $H_2S$. The reaction product $(NH_4)_2S$ is soluble in water and is removed in the form of foul solution. The purpose of removing the $NH_3$ and $H_2S$ from a gas mixture is to purify the gas by freeing it from these constituents. The process is carried out as follows:

The gas containing $NH_3$ and $H_2S$, from which it is desired to remove substantially all the $NH_3$ and at least an equivalent amount of all of the $H_2S$ is fed through line 3 and passed downward through the packed tower 1 then upward through the tower 2. Water is fed to tower 2 through line 9, passed counter-current to the gas in this tower and then pumped through line 5 to the top of tower 1 where it is contacted concurrently with the gas. The flow being concurrent in tower 1 and since $NH_3$ is much more soluble in water than $H_2S$ the major part of the $NH_3$ is absorbed at the top of the tower giving a concentration of $NH_4OH$ in excess of the $H_2S$ absorbed in the liquid. Consequently, as the liquor and the gas flow downward through tower 1 a more rapid absorption of $H_2S$ is effected than would have been possible in counter-current flow since the $H_2S$ reacts with the $NH_4OH$ as rapidly as it is absorbed, thereby maintaining a considerable concentration difference between the gas mixture and the liquid. The remaining gas is contacted counter-currently in tower 2 with fresh water in order to remove whatever $NH_3$ might remain. Towers 1 and 2 are preferably packed.

If a gas containing 4% $H_2S$ and 8% $NH_3$ by volume is treated counter-currently with water at atmospheric pressure and a temperature of 30° C., approximately 175 gallons of water are required per 1,000 cu. ft. of gas to remove substantially all of the $H_2S$. Twenty gallons of water per 1,000 cu. ft. of gas would, however, be sufficient to remove all of the $NH_3$ but would leave the major part of the $H_2S$ in the gas if the whole absorption process would be carried out in countercurrent flow. When, however, the operation is conducted according to the present invention as described above, 20 gallons of water are sufficient to substantially remove the specified amount of $NH_3$ and $H_2S$ from 1,000 cu. ft. of gas.

Another example is the reaction of $H_2S$ and $SO_2$ in aqueous solution according to the equation

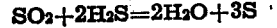

In this case the $SO_2$ is more soluble than the $H_2S$. Furthermore, the reaction product, the elementary sulfur is a solid so that packing cannot be used; otherwise the carrying out of the process is entirely similar to the one described above.

The process is most simply carried out in vertical absorption and reaction towers. However, if circumstances, such as space requirements make it necessary, horizontal towers may also be used. The principle of the process remains the same: concurrent flow in the first tower and counter-current flow in the second.

My invention may be varied in several other ways and is not to be limited by any theory but only by the appended claims in which it is my intention to claim all novelty inherent in the invention.

What I claim is:

1. The method of removing H2S from a gaseous mixture by carrying out a chemical reaction in two reaction zones between two gases one of which is H2S and which are able to react chemically when simultaneously present in solution in a liquid medium and one of which is more readily soluble in the liquid medium than the other one, which comprises, passing a gas mixture containing the two reacting gases through the first reaction zone concurrently with liquid medium containing gases absorbed in the second reaction zone, removing the liquid medium and the reaction product from said first zone, and passing unabsorbed gases into the second reaction zone countercurrently to fresh liquid medium to obtain the liquid medium containing absorbed gases.

2. The method of removing H2S from a gaseous mixture by carrying out a chemical reaction in two vertical reaction zones between two gases one of which is H2S and which are able to react chemically when simultaneously present in solution in a liquid medium and one of which is more readily soluble in the liquid medium than the other one, which comprises, passing a gas mixture containing the two reacting gases through the first reaction zone downwardly together with liquid medium containing gases absorbed in the section reaction zone, removing the liquid medium and the reaction product from the lower part of said first zone, passing unabsorbed gases into the lower part of the second reaction zone, introducing fresh liquid medium at the upper part of the second reaction zone, and contacting the gas and liquid in the second reaction zone, during their counter-current passage to obtain the liquid medium containing absorbed gases.

3. The method of removing H2S from a gaseous mixture by carrying out a chemical reaction in two reaction zones between hydrogen sulfide and one of the gases belonging to the class consisting of ammonia and sulfur dioxide which comprises, passing a gas mixture containing the two reacting gases to the first reaction zone concurrently with water containing gases absorbed in the second reaction zone, removing the water and the reaction product from said first zone, and passing unabsorbed gases into the second reaction zone countercurrently to fresh water to obtain the water containing absorbed gases.

4. The method according to claim 3 in which hydrogen sulfide and sulfur dioxide are brought into reaction.

5. The method of removing H2S from a gaseous mixture by carrying out a chemical reaction in two vertical reaction zones between hydrogen sulfide and a gas belonging to the class consisting of ammonia and sulfur dioxide which, comprises passing a gas mixture containing the two reacting gases through the first reaction zone downwardly together with water containing gases absorbed in the second reaction zone, removing the water and the reaction product from the lower part of the said first zone, passing unabsorbed gases into the lower part of the second zone, introducing fresh water at the upper part of the second reaction zone, and contacting the gas and water in the second reaction zone, during their countercurrent passage to obtain the water containing absorbed gases.

6. Method according to claim 5 in which hydrogen sulfide and sulfur dioxide are brought into reaction.

PAUL E. KUHL.